(12) United States Patent
Vescovini et al.

(10) Patent No.: US 7,931,343 B2
(45) Date of Patent: Apr. 26, 2011

(54) PARKING BRAKE WITH SAFETY DEVICE

(75) Inventors: Maurizio Vescovini, Carpi (IT); Giorgio Benedetti, Modena (IT)

(73) Assignee: CNH America LLC, New Holland, PA (US)

( * ) Notice: Subject to any disclaimer, the term of this patent is extended or adjusted under 35 U.S.C. 154(b) by 788 days.

(21) Appl. No.: 11/974,752

(22) Filed: Oct. 16, 2007

(65) Prior Publication Data

US 2008/0093917 A1    Apr. 24, 2008

(30) Foreign Application Priority Data

Oct. 16, 2006  (IT) .............. BO2006A0714

(51) Int. Cl.
*B60T 13/74* (2006.01)
*B60T 17/16* (2006.01)
*F16D 65/24* (2006.01)

(52) U.S. Cl. ............... 303/2; 303/15; 303/89; 188/170; 188/265

(58) Field of Classification Search .......... 303/2, 3, 303/13, 15, 89; 188/71.5, 72.1, 72.9, 106 P, 188/166, 170, 265
See application file for complete search history.

(56) References Cited

U.S. PATENT DOCUMENTS

| | | | |
|---|---|---|---|
| 3,613,839 A | 10/1971 | Macduff | |
| 5,427,440 A * | 6/1995 | Ward et al. | 303/3 |
| 6,254,197 B1 * | 7/2001 | Lading et al. | 303/2 |
| 7,097,260 B2 | 8/2006 | Brancolini et al. | |
| 7,458,445 B2 * | 12/2008 | Inagaki et al. | 188/72.7 |
| 7,517,026 B1 * | 4/2009 | Herbst et al. | 303/3 |
| 2005/0077781 A1 * | 4/2005 | Brancolini et al. | 303/15 |
| 2005/0127748 A1 | 6/2005 | Goto et al. | |

FOREIGN PATENT DOCUMENTS

WO    WO 2005093280 A1 * 10/2005

* cited by examiner

*Primary Examiner* — Thomas J Williams
(74) *Attorney, Agent, or Firm* — Patrick M. Sheldrake; Michael G. Harris (57) ABSTRACT

A parking brake having an electromechanical and hydraulic device for gripping a pack of movable sectors connected mechanically to the wheels to exert the desired braking force on the wheels. The parking brake is characterized by having an oil flow regulating valve assembly, in turn having a first control solenoid valve and a second safety solenoid valve in series with each other.

5 Claims, 7 Drawing Sheets

Fig.7

PARKING BRAKE WITH SAFETY DEVICE

The present invention relates to a parking brake with a safety device and more particularly to a parking brake with a safety device for a farm tractor.

BACKGROUND OF THE INVENTION

Conventionally, hydraulic arrangements for parking brakes on agricultural equipment only contain one solenoid valve with two slides. When the solenoid valve is energized to an "ON" position, the piston chamber is pressurized so that the piston is retracted and the parking brake is deactivated. The parking brake can be applied by reducing the pressure in the chamber so that the piston is not restrained.

When the tractor is turned off while in motion or if the tractor suffers a loss of power, a resultant fall in pressure in the circuit occurs. The loss of power to the circuit causes the solenoid valve to deenergize, which allows the oil to return to the drain and reduces the pressure in the chamber. The parking brake is thereby activated in a totally uncontrolled manner and results in sharp highly undesirable braking of the tractor.

A parking brake with a safety device to allow controlled braking during blackout electrical failures or other large pressure drops in the system would be highly desirable.

SUMMARY OF THE INVENTION

The present invention is a parking brake that is activated mechanically through the use of pressurized oil acting to compress a pack of Belleville washers. The brake is released hydraulically by draining the pressurized oil and allowing the Belleville washers to push the piston to a brake activation position. The parking brake also has a safety device to prevent sudden uncontrolled engagement of the brake while the vehicle is moving. Uncontrolled engagement of the brakes can occur as a result of various factors, such as electrical failure, turning off the engine, or simply a fall in oil pressure in the main hydraulic circuit.

The object of the present invention is to provide a parking brake with a valve assembly for regulating oil flow between a "parking on" and a "parking off" mode as desired. The parking brake while in "parking off" mode, maintains the oil inside the Belleville washer cylinder under pressure even when the main solenoid valve is not controlled electrically, or when the hydraulic pressure in the circuit falls suddenly for any reason.

The parking brake may be used in any vehicle but has particular advantages when used in a farm tractor, to which the following description refers purely by way of example.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
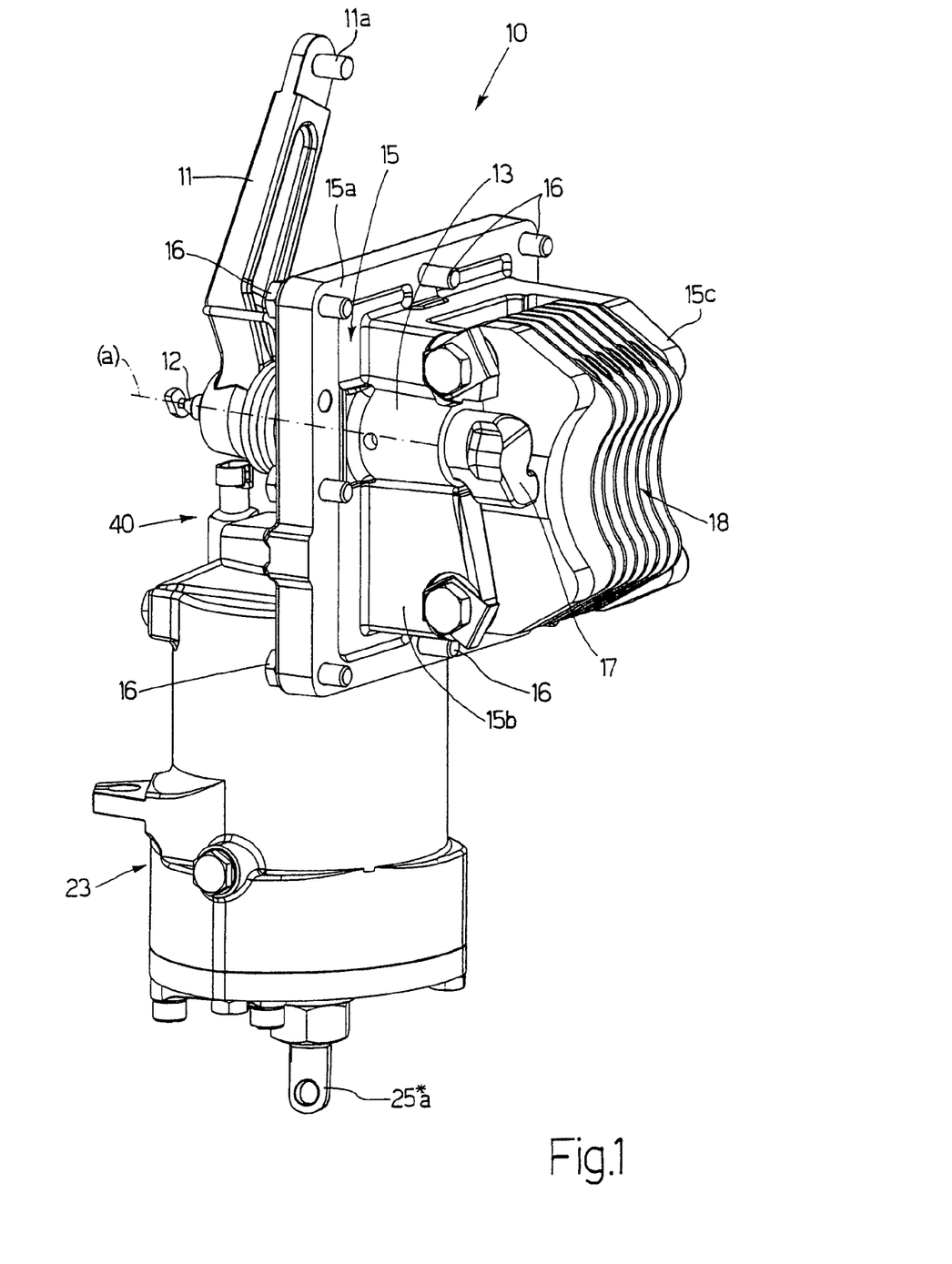
FIG. 1 shows a three-dimensional view of a parking brake in accordance with the present invention.
Figure 2:
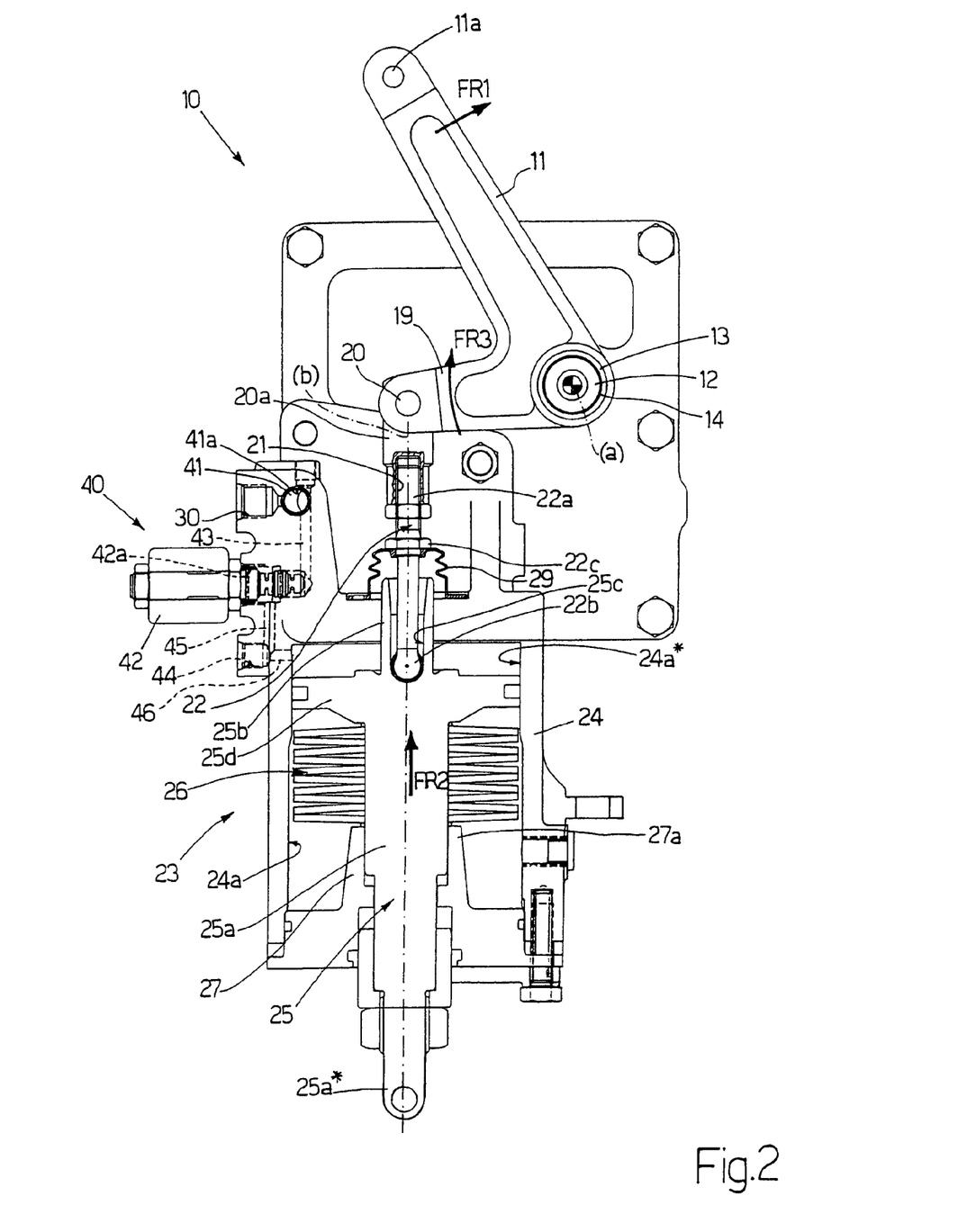
FIG. 2 shows a partial section view of the parking brake of FIG. 1.

FIGS. 1 and 2 show a parking brake 10 comprised of a lever 11, and connection pin 11a, that are rotatable about axis (a). The lever 11 extends from the end of a rotatable shaft 12. The shaft 12 has a longitudinal axis of substantial symmetry defined by axis of rotation (a) and is housed inside a sleeve 13 which is fitted with bushings 14, as shown in FIG. 2. The sleeve 13 is formed in one piece with a monobloc supporting structure 15 having bolts 16 for affixing the parking brake 10 to the rear transmission housing of the tractor.

The monobloc supporting structure 15 has a first plate 15a that is substantially perpendicular to axis (a); a second plate 15b, substantially perpendicular to the first plate 15a and supporting sleeve 13; and a third plate 15c, that is also perpendicular to the first plate 15a and therefore parallel to the second plate 15b.

A distal end of the shaft 12 has a cam member 17, which acts on a pack of movable sectors 18 interposed between the second and third plates 15b, 15c, shown in FIG. 1. The pack of movable sectors 18 acts in a known manner, through not shown mechanical members, on the pinion of the rear wheels to exert the desired braking force on the rear wheels.

An operator can activate the parking brake 10 by rotating the lever 11 in the direction indicated by arrow FR1 so that the shaft 12 grips the pack of movable sectors 18 and exerts a braking force on the pinion of the rear wheels. The lever 11 and shaft can be rotated to exert a braking force on the pinion, either by pulling on a Bowden cable fixed at one end to pin 11a, or by using a hydraulic cylinder assembly that is described below.

FIG. 2 shows that lever 11 is also affixed to a connecting rod 19 that is also hinged about axis (a). The distal end of connecting rod 19 has an articulated joint 20 that is hinged to a fork 20a having a longitudinal axis (b) of substantial symmetry. The non-hinged end of fork 20a has a threaded hole 21. A push rod 22 is provided, which comprises a rod 22a that also an axis (b) of substantial symmetry); a head 22b; and a bellows fastener 22c roughly halfway along the rod 22a and perpendicular to axis (b). The rod 22a is screwed partly inside of a threaded hole 21.

As shown in FIGS. 1 and 2, a hydraulic cylinder assembly 23 is located beneath fork 20a that automatically controls the parking brake 10. The hydraulic cylinder assembly 23 is comprised of a cylinder 24. The cylinder defines a chamber 24a, which houses a piston 25. The piston 25 is supported by a pack of Belleville washers 26.

Best shown in FIG. 2, piston 25 substantially comprises a central body 25a; a top portion 25b, in turn having a cavity 25c; and a guide and sealing member 25d. The bottom portion of the central body 25a of the piston 25 slides inside a cylindrical guide 27 projecting inside the chamber 24a. The pack of Belleville washers 26 is located between one end 27a of the cylindrical guide 27 and the guide member 25d. The head 22b and part of the rod 22a are housed inside the cavity 25c so that head 22b rests on the bottom of the cavity 25c. The push rod 22, while detached from piston 25, acts as an intermediate transmission member between the fork 20a and piston 25. A first end of a bellows 29 is fitted to the bellows fastener 22c; and a second end of the bellows 29 is secured to the top of the cylinder 24.

In the configuration shown in FIG. 2, portion 24a* of the chamber 24a contains a pressurized oil, so that the device is in the parking position. The Belleville washers 26 are therefore partly compressed between the end 27a of the cylindrical guide 27 and the guide member 25d, so that the Belleville washers transmit their force to the piston 25 in the direction of arrow FR2. When the pressure compressing the Belleville washers 26 is released, the washers 26 open and push the piston 25 upwards in the direction of arrow FR2. This produces a similar upward movement of the push rod 22 and fork 20a, thus rotating the connecting rod 19 in the direction of arrow FR3. Since the connecting rod 19 and lever 11 are interconnected, the lever 11 rotates in the direction of arrow FR1, thus producing the related braking phenomena on movable sectors 18, as described previously relative to manual operation.

The hydraulic cylinder assembly 23 has a pressurized-oil inlet 30 connected to a pressurized-oil distribution circuit CIR. The hydraulic cylinder assembly 23 additionally has a valve assembly 40 comprising a first solenoid valve 41 and a second solenoid valve 42, which are both housed in respective seats 41a, 42a; and connected to each other hydraulically by a conduit 43, as shown in FIG. 2. Seat 42a is further connected to an inlet 44 for receiving flow form a hand pump by a second conduit 45. The inlet 44 is also connected through opening 46 in portion 24a* to the chamber 24a. Oil may travel directly from the hydraulic circuit CIR through either inlets 30, 44, conduits 43, 45, or the opening 46. The oil can also be pumped by a hand pump directly through inlet 44 and opening 46 and flow in or out through opening 46.

Figure 3:
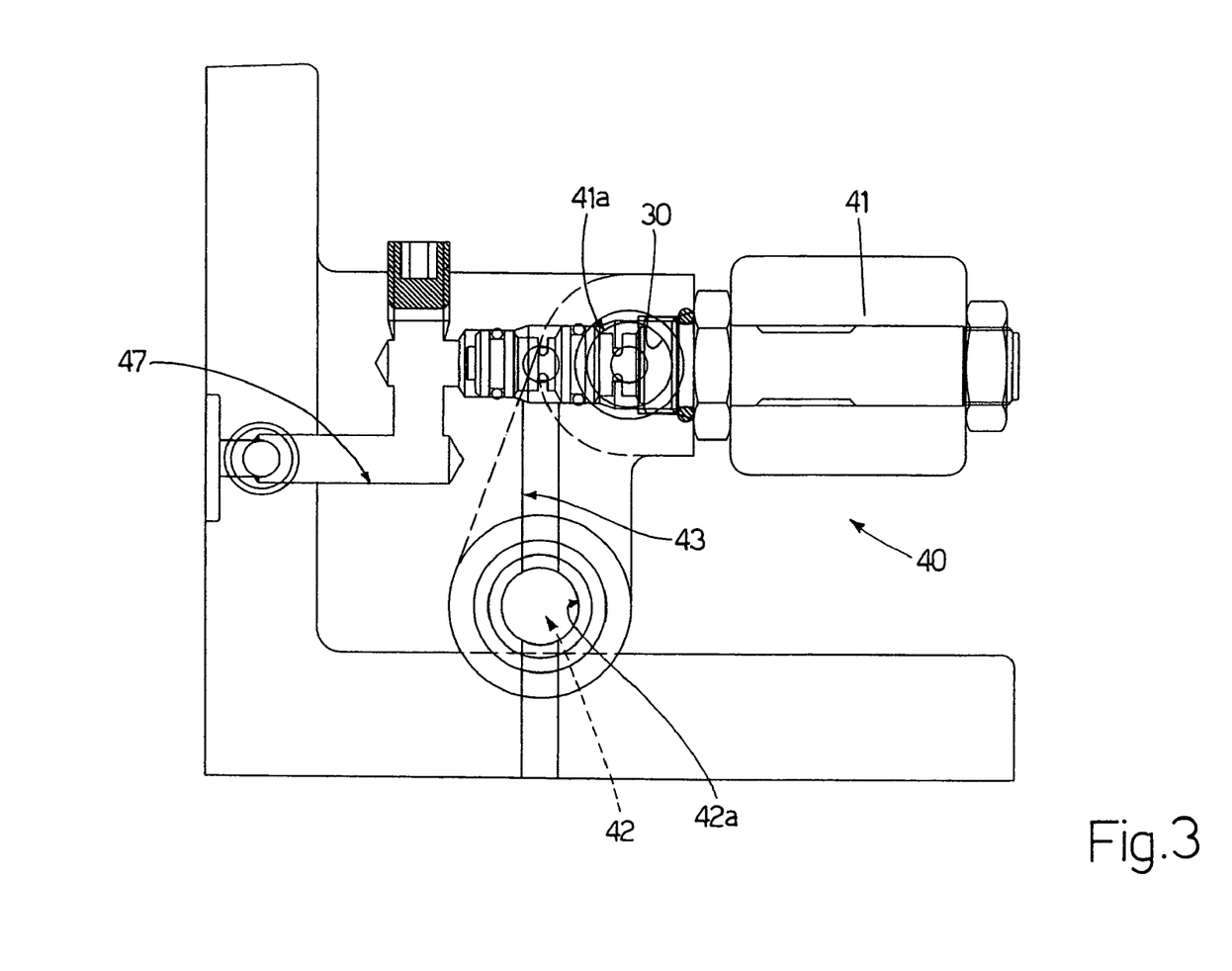
FIG. 3 shows a detailed of the parking brake of FIGS. 1 and 2. brake.

As shown in FIG. 3, a drain conduit 47 extends from seat 41a and is open or closed depending on the position of the slides of solenoid valve 41. A Bowden cable is connected to the bottom end 25a* of central body 25a to release the brake 10 mechanically. The parking brake 10 can be activated either manually by an operator rotating the lever 11, or automatically, by releasing the pressure inside the cylinder 24 to push the piston 25 upwards by means of the pack of Belleville washers 26.

Figure 4:
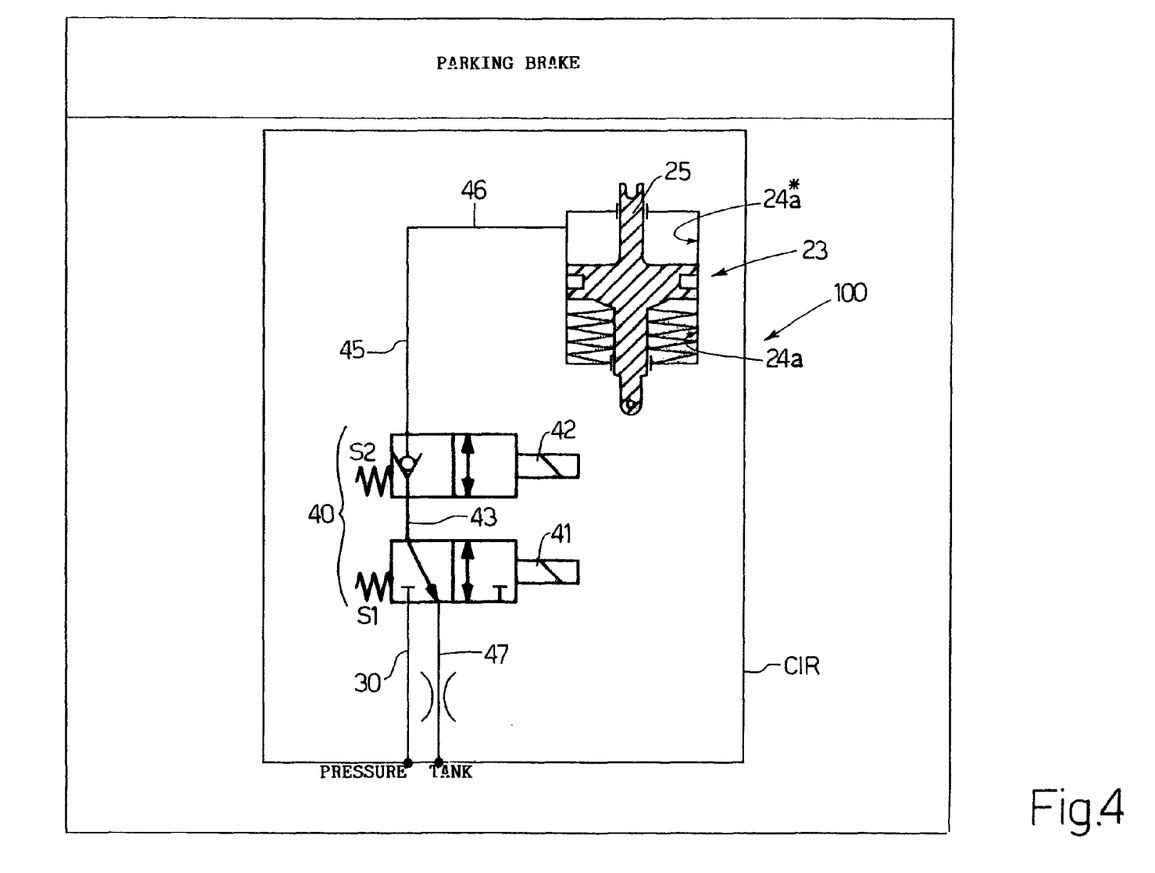
FIG. 4 shows the component parts of a valve assembly of the parking brake of FIGS. 1, 2 and 3.

FIG. 4 shows a hydraulic arrangement 100 of the parking brake 10 according to the present invention. The hydraulic arrangement 100 is comprised of a circuit CIR for distributing pressurized oil to a number of user devices on a tractor. The pressurized oil inlet 30 is shown schematically as a segment. The first solenoid valve 41 is connected hydraulically to the second solenoid valve 42 by conduit 43; and conduits 45, 46 between second solenoid valve 42 and hydraulic cylinder assembly 23. The Hydraulic arrangement 100 also comprises a drain conduit 47, inside the cylinder 24, for draining oil into the transmission housing which acts as a tank.

Figure 5:
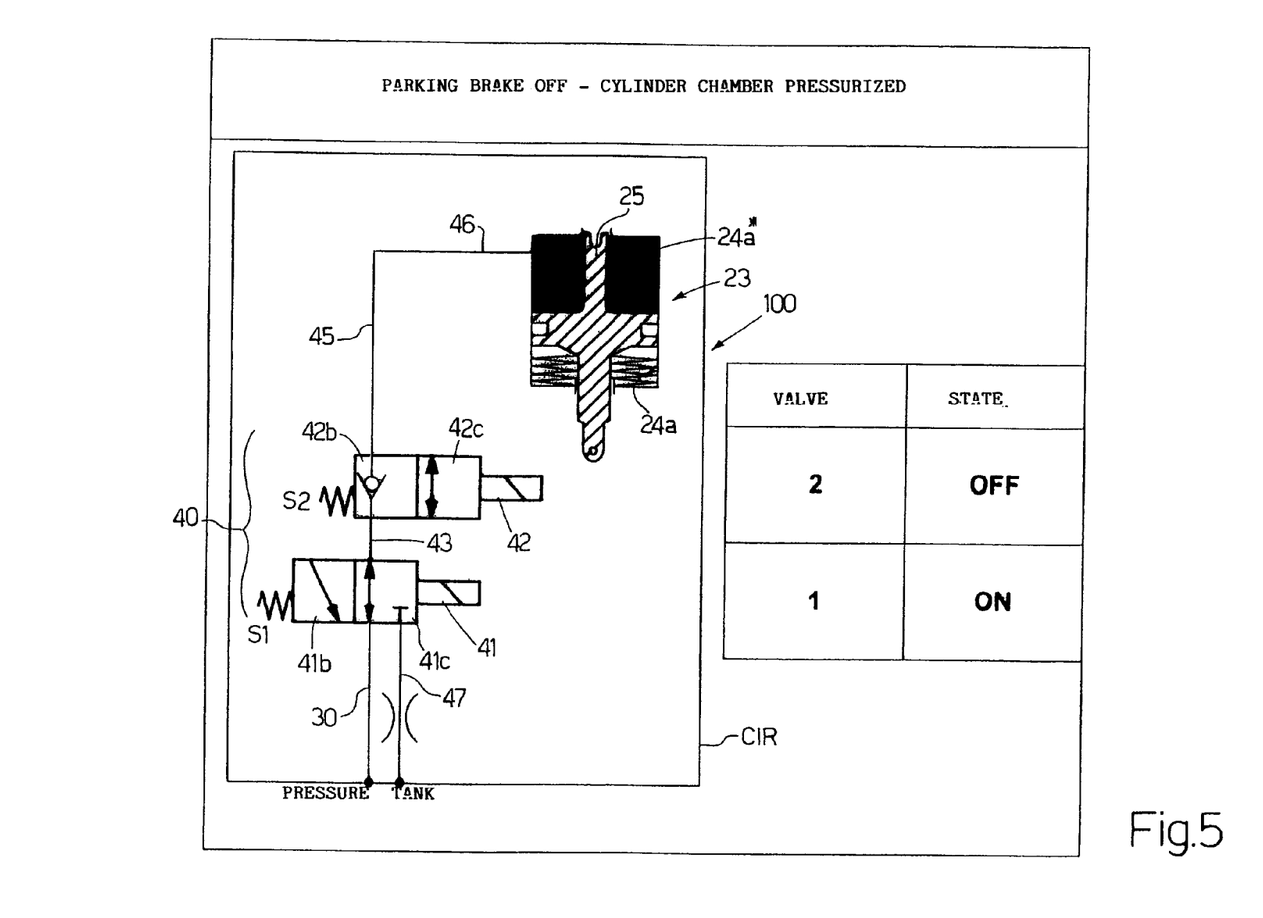
FIG. 5 shows a first configuration of the valve assembly of FIG. 4.
Figure 6:
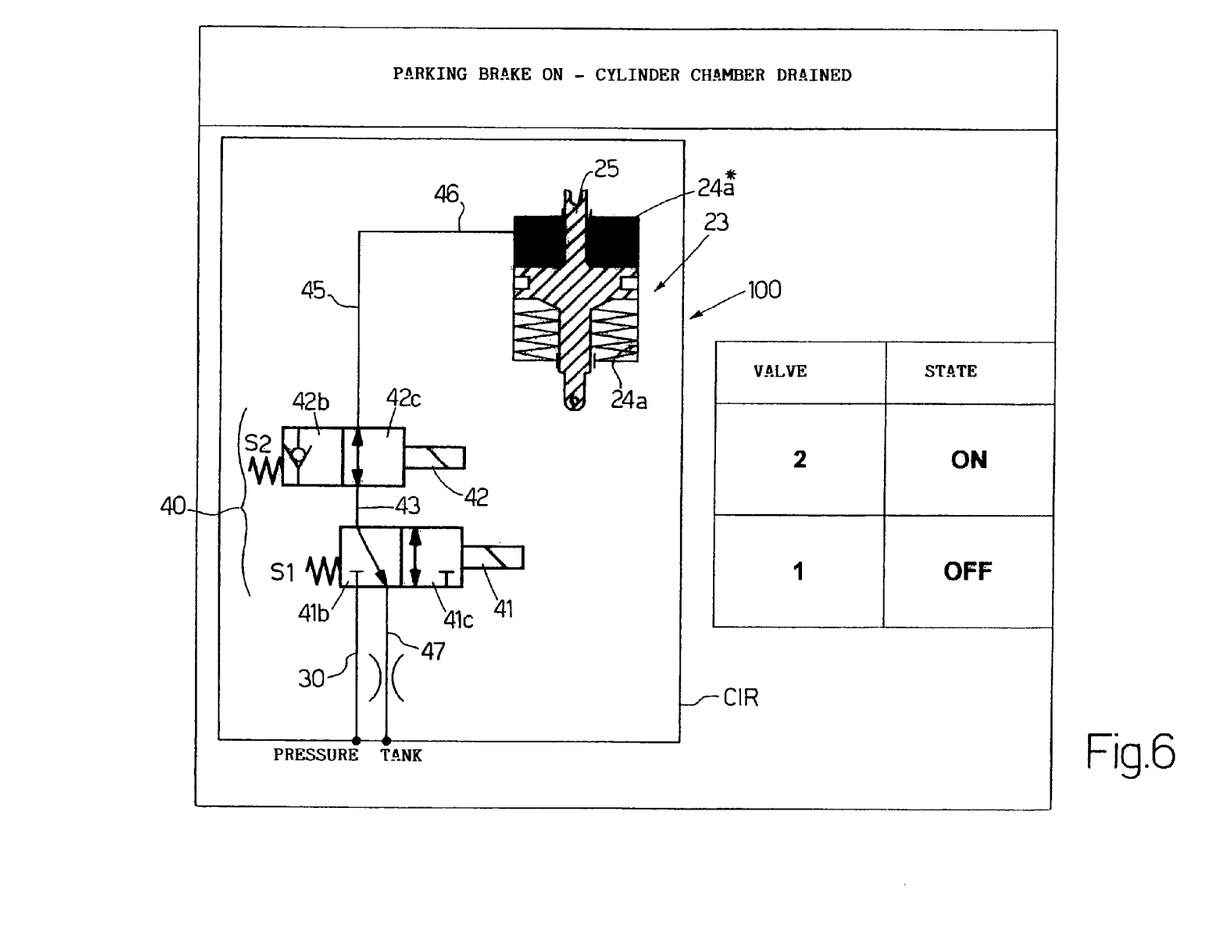
FIG. 6 shows a second configuration of the valve assembly of FIG. 4.
Figure 7:
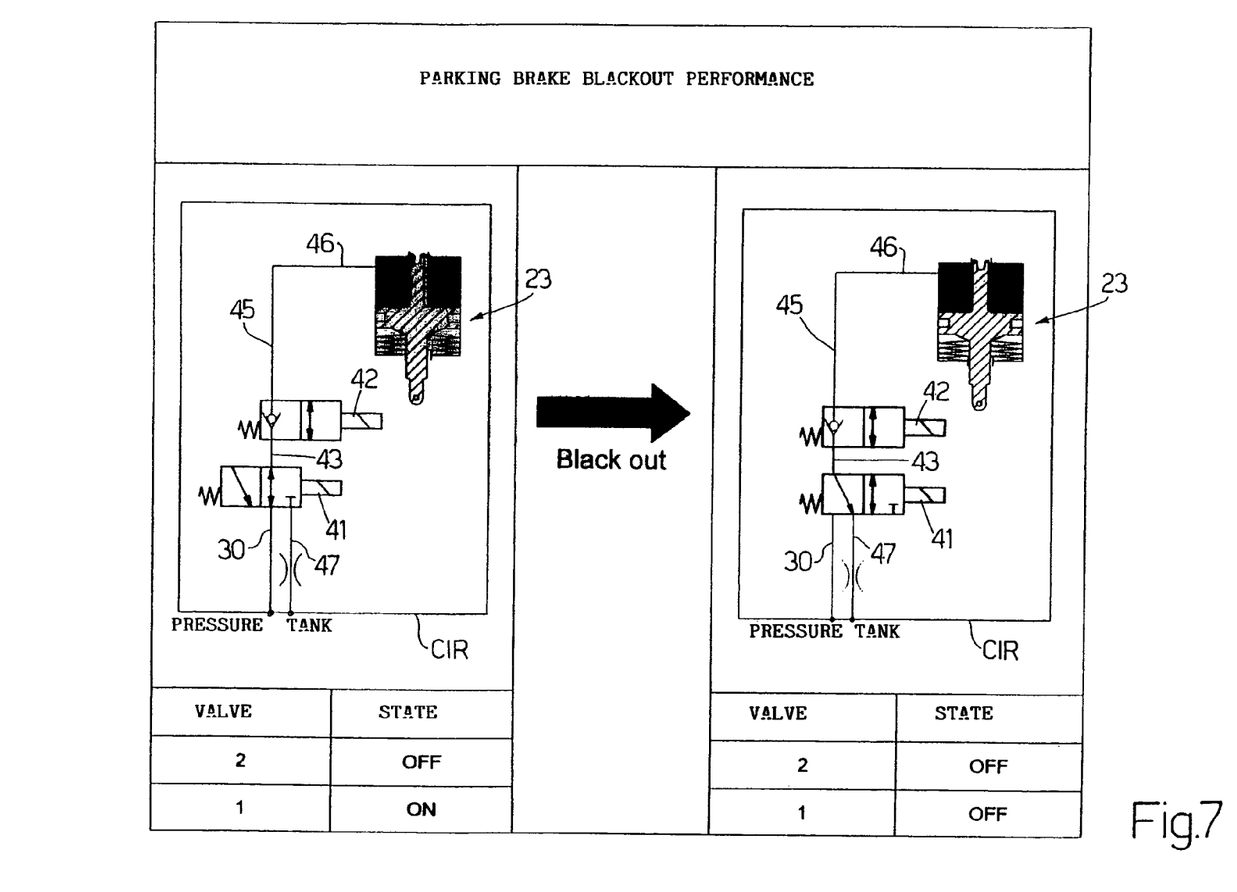
FIG. 7 shows the configuration switch of the valve assembly of FIG. 4 in the event of a system blackout.

In the embodiment of the present invention depicted in FIG. 5, 6, 7 only the first solenoid valve 41 needs be energized and placed in an "ON" position so that the slides 41c and 42b are aligned to pressurize portion 24a* of the chamber 24a so that the brake is released. In this case the solenoid valve 42 has not been energized and is in the "OFF" position. When the valve 42 is not energized, the pressurized oil is allowed into portion 24a* of chamber 24a, thus compressing the guide member 25d and therefore the pack of Belleville washers 26.

To drain the portion 24a* of the chamber, only the second solenoid valve 42 is energized and placed in an "ON" position, while solenoid valve 41 is deenergized and placed in an "OFF" position, so that the slides 41b, 41c are aligned as shown in FIG. 6.

In the event of a tractor blackout the current to both solenoid valves 41, 42, is cut off so that they are in the "OFF" position as shown in FIG. 7. The system switches from the having a pressurized cylinder chamber 24a*, shown in the FIG. 5, to an un-pressurized chamber, shown in FIG. 4. The one-way valve in slide 42b of the second solenoid valve 42 keeps the drain closed, thus keeping the chamber 24a* pressurized and the parking brake off 10. Adding a second safety solenoid valve 42 to solenoid valve assembly 40, achieves a system that is intrinsically safer in the event of a blackout or a fall in hydraulic system pressure.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

What is claimed is:

1. A motor vehicle parking brake with safety device for farm tractors, comprising:
    a braking structure mechanically connectable to at least one wheel of a vehicle;
    an electromechanical and hydraulic device comprised of an oil flow regulating valve assembly, a first control solenoid valve and a second safety solenoid valve, wherein the first control solenoid and the second safety solenoid are mounted in series; and
    said electromechanical and hydraulic device also comprises a hydraulic circuit, a hydraulic cylinder assembly comprising a chamber defined by a cylinder, a piston stressed by a pack of Belleville washers, housed inside the chamber;
    wherein upon actuation the cylinder assembly of the electromechanical and hydraulic device contacts the braking structure to exert a braking force upon the wheel; and
    wherein when the first control solenoid valve is set to an "ON" position and the safe solenoid valve is in an "OFF" position, a portion of said chamber is pressurized, and said piston moves to remove said braking structure from contacting the wheel and deactivate the parking brake.

2. The parking brake of claim 1, wherein the portion of the chamber is drained when the safety solenoid valve is energized to the "ON" position and the control solenoid valve is deenergized to an "OFF" position.

3. A motor vehicle parking brake with safety device for agricultural vehicles, comprising:
    a braking structure mechanically connectable to at least one wheel of a vehicle;
    an electromechanical and hydraulic device comprised of an oil flow regulating valve assembly, a first control solenoid valve and a second safety solenoid valve, wherein the first control solenoid and the second safety solenoid are mounted in series controlling flow to a hydraulic cylinder assembly comprising a chamber, a piston stressed by a biasing device, housed inside the chamber; and wherein upon actuation the cylinder assembly of the electromechanical and hydraulic device biases the braking structure to exert a braking force upon the wheel wherein electric current is removed from both the control solenoid valves and the safety solenoid valve, both valves are in an "OFF" position such that pressure is retained in the chamber of the electromechanical and hydraulic device for resisting deployment of the braking force.

4. The parking brake of claim 3, wherein the valves are placed in an "OFF" position if a determined fall in pressure in the hydraulic circuit occurs.

5. A parking brake with safety device for agricultural vehicles, comprising:

an electromechanical and hydraulic device comprised of an oil flow regulating valve assembly, a first control solenoid valve and a second safety solenoid valve, wherein the first control solenoid and the second safety solenoid are mounted in series controlling flow to a hydraulic cylinder assembly comprising a chamber, a piston stressed by a biasing device, housed inside the chamber;

the hydraulic cylinder assembly connected to a braking structure that is mechanically connectable to a wheel such that a desired braking force is transmitted from the cylinder assembly to the wheel upon actuation of the electromechanical and hydraulic device; and wherein the first control solenoid valve is set to an "ON" position and the safety solenoid valve is in an "OFF" position, a portion of said chamber is pressurized such that the piston removes said braking structure from contacting the wheel.

* * * * *